(12) United States Patent
Lebresne

(10) Patent No.: US 10,666,728 B1
(45) Date of Patent: *May 26, 2020

(54) SYSTEM AND METHOD FOR MAINTAINING DATA CONSISTENCY ACROSS REPLICAS IN A CLUSTER OF NODES

(71) Applicant: DataStax, Santa Clara, CA (US)

(72) Inventor: Sylvain Jean Lebresne, Rennes (FR)

(73) Assignee: DataStax, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,895

(22) Filed: Nov. 12, 2018

(51) Int. Cl.
*G06F 15/16* (2006.01)
*H04L 29/08* (2006.01)

(52) U.S. Cl.
CPC ...... *H04L 67/1095* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 8,984,005 B2* | 3/2015 | Gropper | ............... | G06Q 30/02 |
| | | | | 707/770 |
| 10,037,592 B2* | 7/2018 | Kolb, V | ................. | G06T 5/003 |
| 10,289,555 B1* | 5/2019 | Michaud | ............ | G06F 12/0862 |
| 2007/0103984 A1* | 5/2007 | Kavuri | ................. | G06F 3/0605 |
| | | | | 365/185.17 |
| 2009/0012979 A1* | 1/2009 | Bateni | ................... | G06Q 30/02 |

* cited by examiner

*Primary Examiner* — Dhairya A Patel
(74) *Attorney, Agent, or Firm* — Gard & Kaslow LLP

(57) ABSTRACT

Data consistency across replicas in a cluster of nodes is maintained by continuously validating local data ranges and repairing any inconsistencies found. Local data ranges are split into segments and prioritized. After a segment is selected for validation, a hash value of a portion of the segment is compared to a hash value from other nodes storing replicas of that data. If the hash values match then the data is consistent. If the hash values do not match then the data is not consistent and whichever data is most current according to their timestamps is considered correct. If the local node data is correct, it is communicated to the replica nodes so they can be updated. If the local node data is not correct, then data from the replica nodes is correct and is used to update the data in the local node.

17 Claims, 4 Drawing Sheets

SYSTEM AND METHOD FOR MAINTAINING DATA CONSISTENCY ACROSS REPLICAS IN A CLUSTER OF NODES

FIELD OF THE INVENTION

The present invention relates generally to maintaining data consistency across copies of data in large data stores.

BACKGROUND OF THE INVENTION

As businesses increasingly depend on data and data size continues to increase the importance of data integrity, i.e., the accuracy and consistency of data over time, increases.

Further, data processing has moved beyond the world of monolithic data centers housing large mainframe computers with locally stored data repositories, which is easily managed and protected. Instead, today's data processing is typically spread across numerous, geographically disparate computing systems communicating across multiple networks.

One well-known distributed database example is a NoSQL (Not Only Structured Query Language) database called Cassandra, which is designed to handle big data workloads across multiple nodes with no single point of failure. Its architecture is based on the understanding that system and hardware failures can and do occur. In one sense, Cassandra addresses the problem of failures by employing a peer-to-peer distributed system across homogenous nodes where data is distributed via replication amongst all the nodes in a cluster. Referring now to FIG. 1, a simplified example of the Cassandra architecture can be seen. While oftentimes thought of and referred to as a ring architecture, fundamentally it comprises a cluster of nodes 100 (e.g., Node 1, Node 2 and Node 3, each of which is typically running on a physically separate server computing system) communicating with each other across a network (e.g., Network 110) such as a local area network, a wide area network or the internet.

Referring now to FIG. 2, an exemplary prior art cluster of nodes 200 can be seen. The data in this cluster is distributed across the nodes (labeled Node 1, Node 2, Node 3, Node 4 and Node 5 in this example) which can be visualized as a ring, labeled 201 in the figure. This data distribution is both by range or partition of the overall dataset as well as by replication of the data across multiple nodes in accordance with a replication factor N specifying how many copies of a given data partition are to be replicated to other nodes in the cluster. For example, as can be seen in the figure, the dataset has been partitioned such that partition P1(0,250], which covers data ranging from 0 to 250 in the dataset, is separate from partition P2(250,500], which covers data ranging from 250 to 500 in the dataset, and partition P1 can be found stored in Node 1, Node 2 and Node 3 while partition P2 can be found stored in Node 2, Node 3 and Node 4. It is to be understood that such data partitioning and replication across a cluster of nodes is known in the art.

Further, all nodes in Cassandra are peers and a client (i.e., an external facility configured to access a Cassandra node, typically via a JAVA API (application program interface) and sometimes referred to as a user) can send a read or write request to any node in the cluster, regardless of whether or not that node actually contains and is responsible for the requested data. There is no concept of a master or slave, and nodes dynamically learn about each other through what is known as a gossip broadcast protocol where information is simply passed along from one node to another in the cluster rather than going to or through any sort of central or master functionality.

A node that receives a client query (e.g., a read or search operation) is commonly referred to as a coordinator for the client query; it facilitates communication with the other nodes in the cluster responsible for the query (contacting one or more replica nodes to satisfy the client query's consistency level), merges the results, and returns a single client query result from the coordinator node to the client.

For example, if Node 5 receives a client query from a client then Node 5 becomes the coordinator for that particular client query. In handling that client query, coordinator Node 5 identifies, using techniques known in the art, which other nodes contain data partitions relevant to the client query. For example, if the client query is a read operation with respect to data partitions 0 through 1000, then in this example, Node 1 (containing partition P4(750,1000] and partition P1(0,250]), Node 2 (containing partition P1(0,250] and partition P2(250,500]), Node 3 (containing partition P1(0,250], partition P2(250,500], and partition P3(500, 750]), Node 4 (containing partition P2(250,500], partition P3(500,750] and partition P4(750,1000]) and Node 5 (containing partition P3(500,750] and partition P4(750,1000]) are all identified. As a result, coordinator Node 5 may send a query request 203 to Node 3 with respect to data partitions P1, P2 and P3.

Write operations on a given node, while similar in some respects, are handled somewhat differently than the above-described read operation client queries in other respects. Within each node, e.g., Nodes 1-5 of FIG. 2 but referring now to FIG. 3, a sequentially written disk-based commit log 309 captures write activity by that node to ensure data durability. Data is then indexed and written to an in-memory (i.e., working memory 305) structure, called a memory table or a memtable 303, which resembles a write-back cache. Once the memory structure is full, in what is called a flush operation, the data is written from the memtable 303 in working memory 305 to long term storage (denoted "disk 307" although it may be a solid state device such as flash memory) in what is known as a Sorted String Table (SSTable) type data file 311. Once the data has been written to a data file 311 on disk 307 then the commit log 309 is deleted from the disk 307. As is known the art, these SSTable data files 311 are immutable in that updates and changes are made via new memtable entries which create new SSTable data files rather than overwriting already existing SSTable data files. A process called compaction periodically consolidates SSTables, to discard old and obsolete data.

As stated above, data is distributed via replication amongst all the nodes in the cluster. Such replication ensures there is more than one copy of a given piece of data and is thus an attempt at maintaining data integrity. However, mere replication alone does not guarantee data integrity across the various nodes in the cluster. For example, latency in communicating data between nodes can cause data in one node to differ from replica data in another node, otherwise known as a lack of data consistency between the nodes. As another example, data loss caused by some storage medium failure or data corruption can also cause a lack of data consistency between nodes. For these and other reasons, there is a need for an improved approach to maintaining data consistency across replicas in a cluster of nodes.

SUMMARY OF THE INVENTION

One embodiment discloses a method maintaining data consistency in a cluster of nodes where each node stores data in the form of tables, the method comprising: (a) dividing into data segments, by one node in the cluster of nodes, the data stored as tables by that one node, wherein the data segments are smaller in size than the tables; (b) loading into memory from a globally available location in the cluster of nodes, by the one node, metadata about when the data segments were last analyzed for data consistency; (c) prioritizing for data consistency analysis, by the one node, the data segments; (d) selecting for data consistency analysis, by the one node, a highest priority data segment; (e) dividing into pages, by the one node, the selected highest priority data segment, wherein the pages are smaller in size than the selected highest priority data segment; (f) selecting for data consistency analysis, by the one node, a sequentially next one of the pages; (g) creating a hash value, by the one node, of the selected, sequentially next one of the pages; (h) obtaining, by the one node, a hash value of the selected, sequentially next one of the pages from each other node in the cluster of nodes containing a replica of the selected, sequentially next one of the pages; (i) determining, by the one node, that the created hash value does not match the obtained hash value by comparing, by the one node, that the created hash value to the obtained hash value; (j) obtaining, by the one node, the selected, sequentially next one of the pages and corresponding time stamp from each other node in the cluster of nodes containing the replica of the selected, sequentially next one of the pages; (k) comparing, by the one node, a time stamp of the selected, sequentially next one of the pages with the obtained time stamp from each other node in the cluster of nodes containing the replica of the selected, sequentially next one of the pages; (l) sending as an update, by the one node, the selected, sequentially next one of the pages to each other node in the cluster of nodes containing the replica of the selected, sequentially next one of the pages, when the comparison shows the selected, sequentially next one of the pages has the most current time stamp; and, (m) updating, by the one node, the selected, sequentially next one of the pages of the one node with the obtained sequentially next one of the pages having a most current time stamp and sending as an update, by the one node, the obtained sequentially next one of the pages having the most current time stamp to each other node in the cluster of nodes containing the replica of the selected, sequentially next one of the pages, except for the node in the cluster of nodes containing the obtained sequentially next one of the pages having the most current time stamp, when the comparison shows the selected, sequentially next one of the pages does not have the most current time stamp.

In a further embodiment, the method further comprises: repeating steps (f) through (l) until it is determined, by the one node, that there are no more sequentially next one of the pages to be selected; and updating the metadata in the globally available location with the results of steps (l) and (m).

In a still further embodiment, the method further comprises repeating steps (c) through (m).

In a yet still further embodiment, the prioritizing for data consistency analysis the data segments is performed by computing a priority score for each of the data segments; and wherein the highest priority data segment is the data segment having a lowest priority score.

A still further embodiment discloses a non-transitory computer readable storage medium having embodied thereon a program, the program executable by a processor to perform a method of maintaining data consistency in a cluster of nodes where each node stores data in the form of tables, the method comprising the steps of: (a) dividing into data segments, by one node in the cluster of nodes, the data stored as tables by that one node, wherein the data segments are smaller in size than the tables; (b) loading into memory from a globally available location in the cluster of nodes, by the one node, metadata about when the data segments were last analyzed for data consistency; (c) prioritizing for data consistency analysis, by the one node, the data segments; (d) selecting for data consistency analysis, by the one node, a highest priority data segment; (e) dividing into pages, by the one node, the selected highest priority data segment, wherein the pages are smaller in size than the selected highest priority data segment; (f) selecting for data consistency analysis, by the one node, a sequentially next one of the pages; (g) creating a hash value, by the one node, of the selected, sequentially next one of the pages; (h) obtaining, by the one node, a hash value of the selected, sequentially next one of the pages from each other node in the cluster of nodes containing a replica of the selected, sequentially next one of the pages; (i) determining, by the one node, that the created hash value does not match the obtained hash value by comparing, by the one node, that the created hash value to the obtained hash value; (j) obtaining, by the one node, the selected, sequentially next one of the pages and corresponding time stamp from each other node in the cluster of nodes containing the replica of the selected, sequentially next one of the pages; (k) comparing, by the one node, a time stamp of the selected, sequentially next one of the pages with the obtained time stamp from each other node in the cluster of nodes containing the replica of the selected, sequentially next one of the pages; (l) sending as an update, by the one node, the selected, sequentially next one of the pages to each other node in the cluster of nodes containing the replica of the selected, sequentially next one of the pages, when the comparison shows the selected, sequentially next one of the pages has the most current time stamp; and, (m) updating, by the one node, the selected, sequentially next one of the pages of the one node with the obtained sequentially next one of the pages having a most current time stamp and sending as an update, by the one node, the obtained sequentially next one of the pages having the most current time stamp to each other node in the cluster of nodes containing the replica of the selected, sequentially next one of the pages, except for the node in the cluster of nodes containing the obtained sequentially next one of the pages having the most current time stamp, when the comparison shows the selected, sequentially next one of the pages does not have the most current time stamp.

DETAILED DESCRIPTION OF THE INVENTION

A method and apparatus is disclosed for maintaining data consistency across replicas in a cluster of nodes. In this approach, each node runs a node synchronization service module or operation that continuously validates local data ranges' consistency with replica nodes and repairs any inconsistency found. The local data ranges are split into small segments, which act as validation save points. In one embodiment, segments are prioritized before being selected for validation. After a segment is selected for validation, a hash value of a portion of the segment is computed and compared to a hash value requested and received from other nodes storing replicas of that data. If the respective hash values match then the data is consistent between the nodes and if that is true for all hashed portions of the segment then metadata is stored in a table shared across the nodes indicating this result. Conversely, if the respective hash values do not match then the data is not consistent between the nodes and the data, along with timestamps stored with the data indicating when the data was stored, is requested from the other nodes storing replicas of that data. These timestamps are then compared and whichever data is most current is considered correct (it being understood that, as is known in the art, basing data correctness on whichever data is most current is the standard rule in Cassandra database systems). If the data in the local node is correct, again because it is the most current according to the timestamps, then the data is communicated to the replica nodes so they can be updated. Conversely, if the data in the local node is not correct, because it is not the most current, then whichever data from the replica nodes is correct, again because it is the most current, is then used to update the data in the local node. This process will now be explained in greater detail along with description of a preferred embodiment for prioritizing segments.

Figure 1:
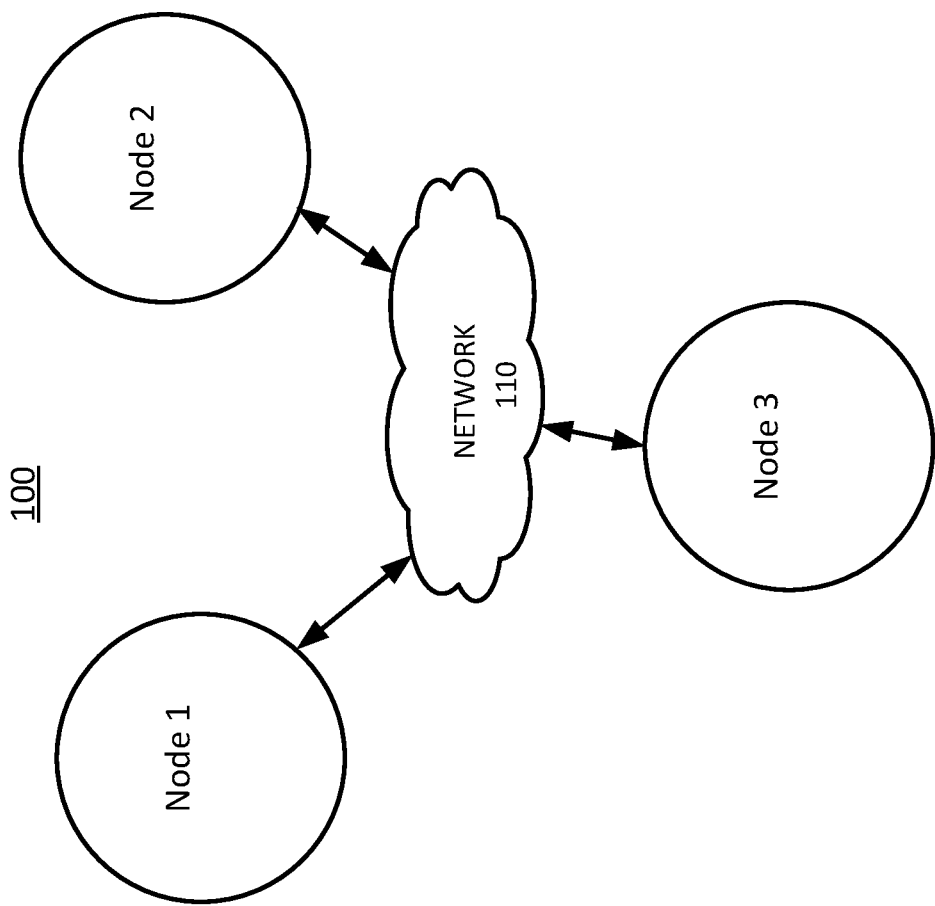
FIG. 1 is an illustration of an example prior art Cassandra node architecture.
Figure 2:
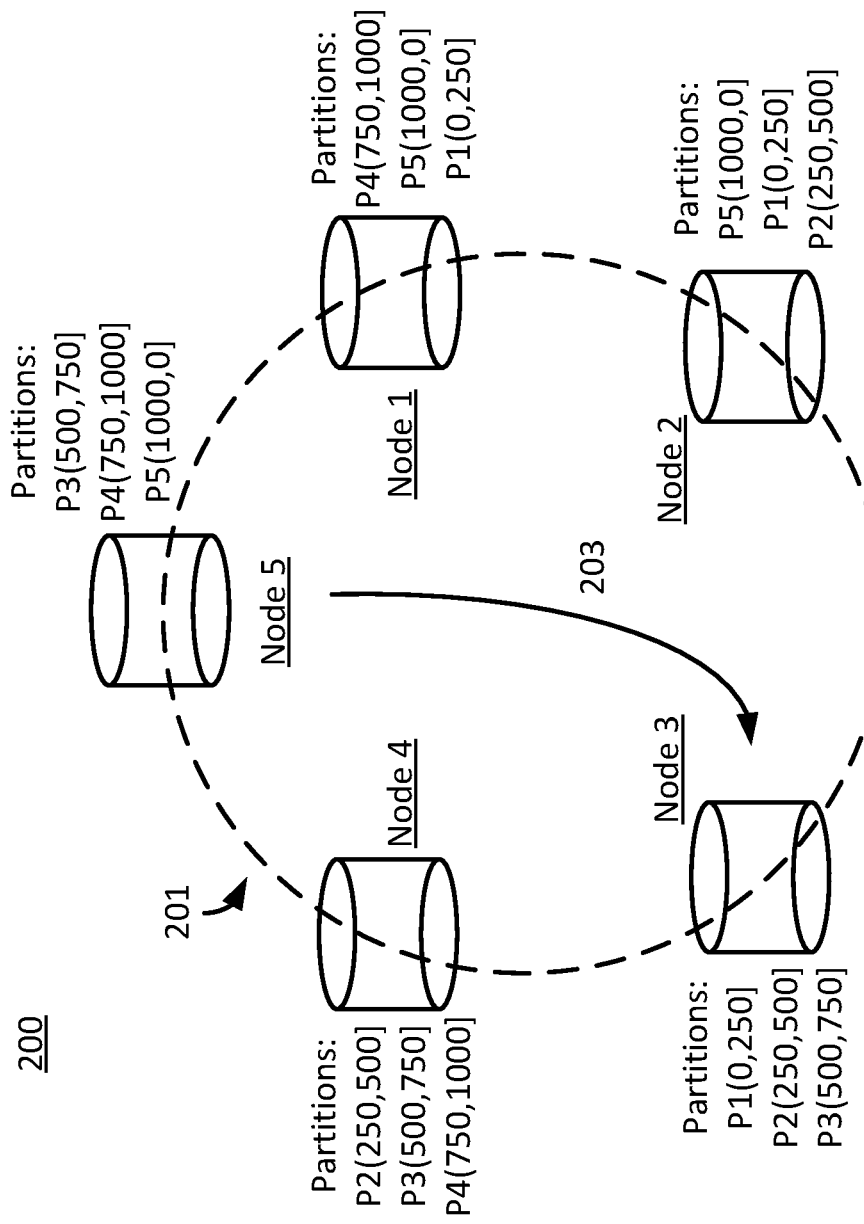
FIG. 2 is an example prior art cluster of nodes.
Figure 3:
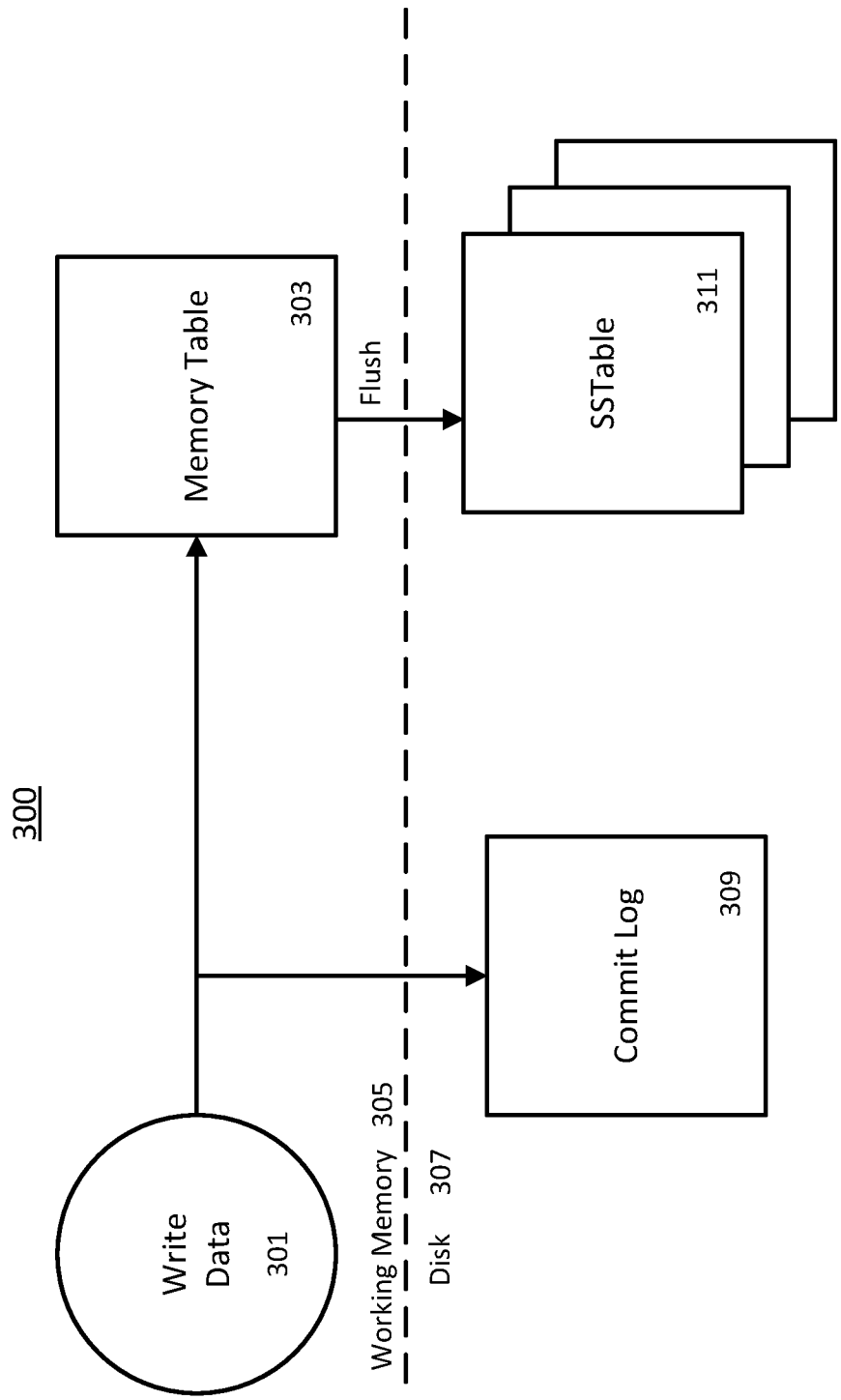
FIG. 3 is an example illustration of Cassandra's prior art write data architecture.
Figure 4:
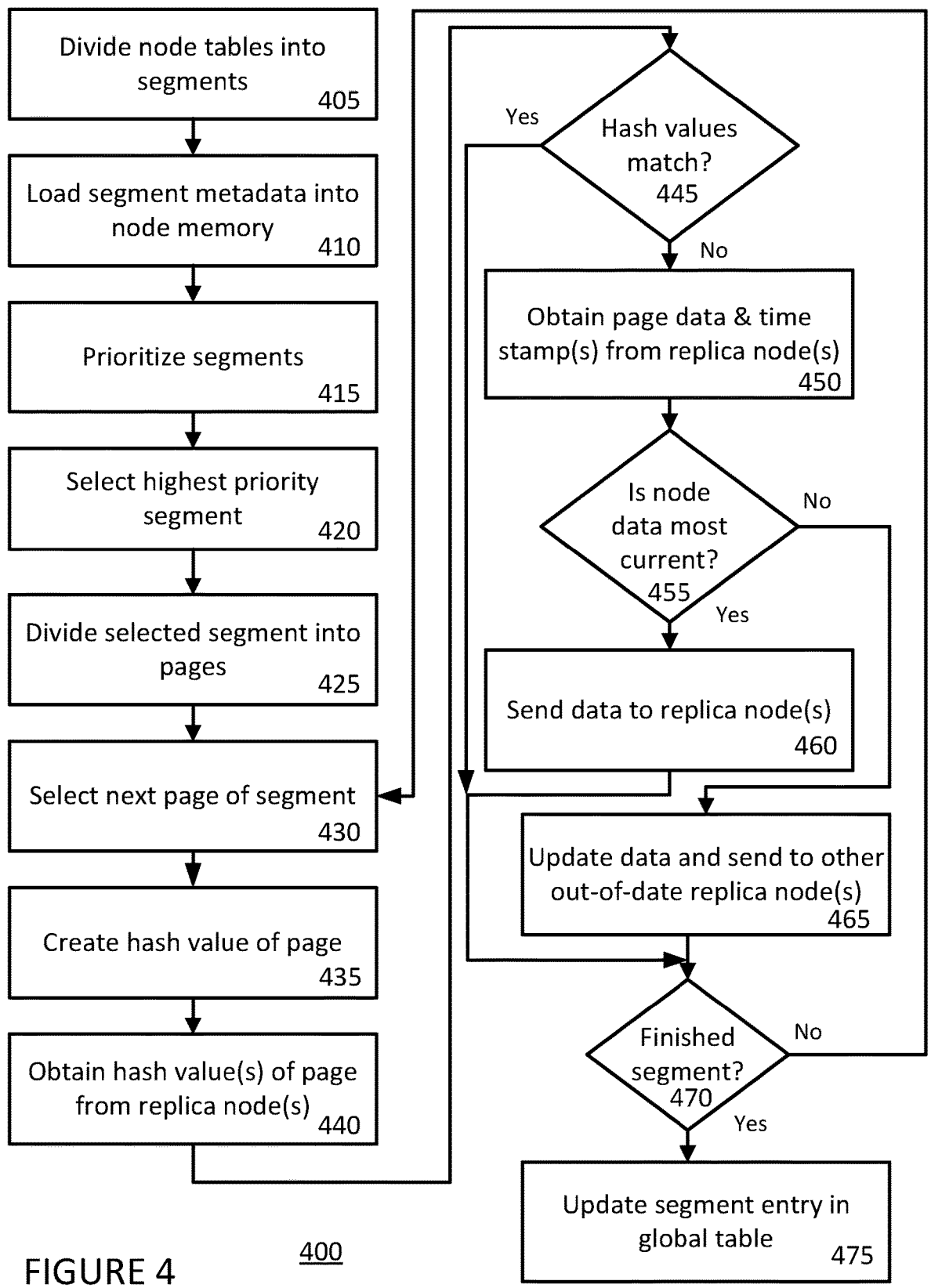
FIG. 4 is a flowchart of a process of maintaining data consistency across replicas in a cluster of nodes according to the present approach.

Referring now to FIG. 4, a process of maintaining data consistency across replicas in a cluster of nodes according to the present approach will now be explained.

The following operations are described from the perspective of a single node in a cluster of nodes. However, it is to be understood in light of the teachings herein that each node in a cluster runs software to perform these data consistency operations and communicates with other nodes in the cluster to avoid duplicating data inconsistency repairs.

As is known in the art, each node knows of the existence of the data, stored as tables, and the table sizes stored on its respective node. In step 405, a node divides those tables into data segments. In a preferred embodiment, the segments are 200 MegaByte (MB) in size, which is the granularity of size that nodes save their progress and, further, avoids being so small that would cause the corresponding metadata described below to become too voluminous.

In step 410, the node loads into its memory metadata about the segments. As described further below, this metadata includes information about when the segments were last analyzed for data consistency.

In step 415, the node prioritizes the segments for data consistency analysis and repair. This prioritization can be done according to any known prioritization schema as desired for a given implementation. In a preferred embodiment, described further elsewhere herein, the prioritization schema is a form of Least Recently Used (LRU), which here means least recently analyzed and repaired.

In step 420, the node selects the highest priority segment for data consistency analysis and/or repair. The combination of steps 415 and 420 can be considered a process of scheduling validation of data consistency of the segments.

In step 425, the selected segment is divided into pages. In a preferred embodiment, the pages are 10s to 100s of KiloBytes (KBs) in size. Dividing a segment into pages is performed in order to analyze data consistency at an even lower or smaller level of granularity than the segment size, as explained below. It is to be noted that analyzing data consistency at a smaller level of granularity than segment size reduces operational memory size needed for the analysis process and also lowers the odds of having hashes not match (i.e., the smaller the size of data being compared, the lower the odds of their respective hashes not matching).

In step 430, a first or sequentially next one of the pages is selected. In step 435, a hash value is created from the selected page. Creating a hash value can be performed using any known hash function or algorithm known in the art.

In step 440, a hash value from each of the one or more replica nodes is obtained. In particular, the node sends a request to each of the one or more other node(s) containing replicas of the table, segment, and page, the request being for each of those one or more replica node(s) to send back, in return, a hash value of their copy of that page.

In step 445, the node compares the hash value created of its copy of the page in step 435 with those hash value(s) of copy(ies) of the page received from replica node(s) in step 440 to determine whether the hash values match.

If the hash values match in step 445, this means the data in the node's page is consistent with the data in the page(s) of the replica node(s). The process continues by making a determination, in step 470, regarding whether there are any more pages left to analyze in the segment. If there are more pages left to analyze in the segment, then the process returns to step 430 to select a next page of the segment to analyze and the process continues.

Conversely, if the hash values do not match in step 445, this means that the data in the node's page is inconsistent with the data in the page(s) of the replica node(s). In that case, the process continues by, in step 450, the node obtaining the page data and corresponding time stamp(s) from the replica node(s). As is known in the art, data has a corresponding time stamp indicating when the data was stored, which is used in the compaction process discussed elsewhere herein.

Having now obtained the page data and corresponding time stamp(s) from the replica node(s), in step 455 the node determines which is the most current, and therefore correct, data. In particular, the node compares the time stamp(s) received from the replica node(s) with the time stamp for its own copy of the page, and whichever is the most recent informs the node whether its own page data or that of the replica node(s) is the most current.

If the determination made in step 455 is that the node's data is the most current then, in step 460, the node sends its page data to the one or more replica node(s) so that they can update their copy of the page data. In a preferred embodiment, such updates to the replica nodes are performed using the standard write process, as discussed elsewhere herein, rather than a more error prone and brittle process of modifying existing SSTable entries. Also in a preferred embodiment, the node waits to receive an acknowledgement back from the replica node(s) before proceeding (or fails the segment if such an acknowledgement is not received within a predetermined "time out" period).

Conversely, if the determination made in step 455 is that the node's data was not the most current then, in step 465, the node updates its copy of the page with the more current data received from the replica node(s) and also sends a copy of the more current data to any other replica node also containing out of date data as was indicated by the time stamp(s) obtained in step 450. In a preferred embodiment, as with updates to the replica nodes resulting from step 460, the node updating its copy of the page is performed using the standard write process, as discussed elsewhere herein.

In step 470, as described elsewhere herein, the process determines whether there are any more pages in the segment to be analyzed and, if so, returns to step 430 to continue the process. Conversely, if the determination made in step 470 is that the segment is finished (i.e., that there are no more pages in the segment to be analyzed for data consistency), then in step 475 the segment entry in the global table is updated to reflect the outcome of the data consistency operations just performed. Although not shown in the figure, the process then returns to step 415 to once again prioritize the segments for data consistency analysis and/or repair and continue the various data consistency operations.

In particular, and in a preferred embodiment, the global table is updated to reflect the following possible outcomes:
1) Successful (the data was already consistent);
2) Successful (the data was made to be consistent);
3) Unsuccessful (not all replica nodes responded, but the data was consistent with all replica nodes that did respond);
4) Unsuccessful (not all replica nodes responded, but the data was made to be consistent for those that did respond);
5) Unsuccessful (at most one replica node was available/responded and that no data consistency comparison was performed);
6) Unsuccessful (some unexpected error(s) occurred).

It is to be understood, in light of the teachings herein, that one portion of a page's data may be the most current while another portion of a page's data may not be the most current. This is because a page's data may straddle or overlap more than one row of a table. If that is the case, determining the most current page data, as discussed above in steps 455 and step 465, may be at a finer level of granularity than the entire page. Should that occur, then the portions of the page data are handled separately in terms of determining which is the most current, and therefore correct, and in terms of updating any page data.

The preferred embodiment of the prioritization schema used to perform step 415 will now be described. Prioritization of segments works by computing a "priority score" for each segment. The next segment chosen to validate/check for data consistency is the one with a lowest or minimal such score (and validating the segment increases this segment's score in such a way that it will not be picked again for some time).

This priority score, which for a segment S is denoted here as p(S), is based on the following three parameters:
1) The time, denoted here as 'lastValidation', when the segment was last validated (regardless of whether that last validation was successful or not);
2) The time, denoted here as 'lastSuccess', when the segment was last successfully validated; and
3) A per-table user/system administrator configurable parameter denoted here as the 'deadlineTarget', which is a desired maximum time between validation of any given segment for the table. So, for example, if for a table T, the user/system administrator configured the deadlineTarget to be 5 days, for the objective is that all the data of T is checked for consistency at least once every 5 days. It is to be understood, however, that the system does not, and cannot, guarantee this result because, for example, if a node of the cluster remained offline for 5 days in a given instance, then there is no way the system can check the consistency of this node data with others during that window and so honor the deadlineTarget. Still, knowing the user/system administrator's desire allows the system to alert the user when the system cannot meet that desire. As importantly, and with respect to prioritization, this parameter also allow a user/system administrator to control the relative prioritization of different tables. For example, if a user/system administrator configured a table T1 with a deadlineTarget of 5 days, but another table T2 with a deadlineTarget of 10 days, then segments belonging to T1 will be prioritized more aggressively than those of T2 (so that the data for T1 is checked for inconsistencies twice as often as that of T2).

In this preferred embodiment, as should now be understood in light of the teachings herein, this priority score corresponds to the time when the segment should ideally next be validated. At any given time, the segment with the highest priority, the most pressing, is the one whose ideal maximal time of next validation is the smallest (occurs sooner). However, the score of a segment is used only to decide prioritization, not to decide when to actually validate the segment. That is, if a segment priority score happens to correspond to 'now+5 days', that does not mean the segment will only be validated in 5 days. Instead, it only means that it will be chosen before any other segment whose score is greater than that.

The score simple case is when lastValidation=lastSuccess, that is when the last validation of the segment was fully successful. In that case, p(S)=S.lastValidation+S.deadlineTarget In other words, if a segment has just been validated, the maximal time at which it is to next be validated is "now" plus whatever maximal time the user/system administrator configured for the table (the deadlineTarget).

If the lastValidation was not successful however (which typically happens because a node had a failure during the validation), things are a bit more complex, resulting in p(s)=(S.lastValidation+S.deadlineTarget)−d(S.deadlineTarget, S.lastSuccess)

So this starts from the same value as if the last validation was successful (S.lastValidation+S.deadlineTarget) but retrieves some delta from that score.

This is based on the following two ideas:
1) A failed validation does not really count towards that deadlineTarget the user/system administrator configured, so it should be retried (possibly much) sooner than if it was successful, or the deadlineTarget will not be met even where possible.
2) At the same time, it is undesirable to completely ignore failed validations in the score computation. If that were done and a failed validation was not changing the segment priority score, it would imply that the segment whose validation just failed is still the one with the highest priority score (it was validated only if this segment's score was the minimum before the validation, so if a failed validation doesn't impact the score, it is still the minimum). In other words, as a soon as a segment validation fails, the system would loop on that segment until it is able to validate it successful. But this is undesirable since again, typically failures are due to node failing, which is generally temporary (the node will be restarted) but not immediate. So when the validation of a segment fails, it is more productive to wait a little bit before retrying that segment and try other segments that may well not be affected by whatever condition made the validation fail.

The role of the delta (d(S.deadlineTarget, S.lastSuccess)) in the formula above has now been explained. It is computed in such a way that a failed validation does increase the segment priority, but not as much as a successful one.

However, an important aspect of that delta value is that is based on the last successful validation of the segment and the configured deadlineTarget in such a way that it has the following property: the closer the segment is to fail his deadlineTarget (from the last successful validation), the more aggressive a failed validation is retried. To illustrate this with an example, say a table T has a deadlineTarget of 5 days and say that a segment S last successful validation was at a time t. Then say the next validation on S fails. Then the priority score resulting from that failed validation will be increased more (it is retried less aggressively) if the failed validation was done at 't+1 day', than if it was done at 't+4 day'. The idea here is that if a validation fails at 't+1 day', there are still 4 days before the deadlineTarget for that segment, so more time can be afforded until retrying it. But if a validation fails at 't+4 days', there is only 1 day until the deadlineTarget passes, so it should be retried more aggressively.

Also in a preferred embodiment, the data consistency process is rate limited at the page level on a per node basis. In particular, a user/system administrator can configure a validation rate (in KiloBytes per second, "KB/sec"), which limits or controls the speed of the validation process for that node. The system then adds variable pauses between pages to slow down the process or increases the number of segments validated in parallel to speed up the process, in an effort to achieve the configured validation rate. This helps ensure controllable and predictable impact of the data consistency process on the node.

Further in a preferred embodiment, as discussed above, metadata about the progress of validation operations for data consistency on a segment basis persist and are available for other nodes. This ensures (1) that such operations can resume progress following an operation failure, (2) that work can be coordinated between nodes (because that metadata is shared by and/or accessible to all nodes, a given node can take another node's progress into account and thereby avoid duplicative operations), and (3) the progress of such operations can be exposed to an external software agent or module (e.g., a monitoring tool) so that a user/system administrator can monitor behavior of the system.

As has now been explained, the present approach maintains data consistency across replicas in a cluster of nodes. In particular, the present approach ensures data consistency between those replica nodes by comparing hash values at a level of granularity smaller than a segment and based on a segment prioritization. Further, this data consistency approach can be performed as a background task and without needing user/system administrator direction to begin operation.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result or performance of all of the described steps.

There may be a single computing system, server or processor, or multiple computing systems, servers or processors performing different functions of the functions described herein, including those of a signal node described herein. One of skill in the art will appreciate how to determine which and how many of each will be appropriate for a specific intended application.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

These and other variations upon the embodiments described and shown herein are intended to be covered by the present disclosure, which is limited only by the appended claims.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of maintaining data consistency in a cluster of nodes where each node stores data in the form of tables, the method comprising:
 (a) dividing into data segments, by one node in the cluster of nodes, the data stored as tables by that one node, wherein the data segments are smaller in size than the tables;
 (b) loading into memory from a globally available location in the cluster of nodes, by the one node, metadata about when the data segments were last analyzed for data consistency;
 (c) prioritizing for data consistency analysis, by the one node, the data segments;
 (d) selecting for data consistency analysis, by the one node, a highest priority data segment;
 (e) dividing into pages, by the one node, the selected highest priority data segment, wherein the pages are smaller in size than the selected highest priority data segment;
 (f) selecting for data consistency analysis, by the one node, a sequentially next one of the pages;
 (g) creating a hash value, by the one node, of the selected, sequentially next one of the pages;
 (h) obtaining, by the one node, a hash value of the selected, sequentially next one of the pages from each other node in the cluster of nodes containing a replica of the selected, sequentially next one of the pages;
 (i) determining, by the one node, that the created hash value does not match the obtained hash value by comparing, by the one node, that the created hash value to the obtained hash value;
 (j) obtaining, by the one node, the selected, sequentially next one of the pages and corresponding time stamp from each other node in the cluster of nodes containing the replica of the selected, sequentially next one of the pages;

(k) comparing, by the one node, a time stamp of the selected, sequentially next one of the pages with the obtained time stamp from each other node in the cluster of nodes containing the replica of the selected, sequentially next one of the pages;

(l) sending as an update, by the one node, the selected, sequentially next one of the pages to each other node in the cluster of nodes containing the replica of the selected, sequentially next one of the pages, when the comparison shows the selected, sequentially next one of the pages has the most current time stamp; and, (m) updating, by the one node, the selected, sequentially next one of the pages of the one node with the obtained sequentially next one of the pages having a most current time stamp and sending as an update, by the one node, the obtained sequentially next one of the pages having the most current time stamp to each other node in the cluster of nodes containing the replica of the selected, sequentially next one of the pages, except for the node in the cluster of nodes containing the obtained sequentially next one of the pages having the most current time stamp, when the comparison shows the selected, sequentially next one of the pages does not have the most current time stamp.

2. The method of claim 1 further comprising:
repeating steps (f) through (l) until it is determined, by the one node, that there are no more sequentially next one of the pages to be selected; and
updating the metadata in the globally available location with the results of steps (l) and (m).

3. The method of claim 1 further comprising repeating steps (c) through (m).

4. The method of claim 1 wherein the data segments are 200 MegaBytes (MB) in size.

5. The method of claim 1 wherein prioritizing for data consistency analysis the data segments uses a Least Recently Used (LRU) schema.

6. The method of claim 1 wherein;
prioritizing for data consistency analysis the data segments is performed by computing a priority score for each of the data segments; and,
wherein the highest priority data segment is the data segment having a lowest priority score.

7. The method of claim 1 wherein the pages are 10s to 100s of KiloBytes (KB) in size.

8. The method of claim 1 wherein sending as an update, by the one node, the selected, sequentially next one of the pages to each other node in the cluster of nodes containing the replica of the selected, sequentially next one of the pages uses a standard write process.

9. The method of claim 1 wherein updating, by the one node, the selected, sequentially next one of the pages of the one node with the obtained sequentially next one of the pages having a most current time stamp and sending as an update, by the one node, the obtained sequentially next one of the pages having the most current time stamp to each other node in the cluster of nodes containing the replica of the selected, sequentially next one of the pages, except for the node in the cluster of nodes containing the obtained sequentially next one of the pages having the most current time stamp, uses a standard write process.

10. The method of claim 1 wherein the method is performed by each node in the cluster of nodes.

11. A non-transitory computer-readable storage medium having embodied thereon a program, the program being executable by a processor to perform a method of maintaining data consistency in a cluster of nodes where each node stores data in the form of tables, the method comprising the steps of:

(a) dividing into data segments, by one node in the cluster of nodes, the data stored as tables by that one node, wherein the data segments are smaller in size than the tables;

(b) loading into memory from a globally available location in the cluster of nodes, by the one node, metadata about when the data segments were last analyzed for data consistency;

(c) prioritizing for data consistency analysis, by the one node, the data segments;

(d) selecting for data consistency analysis, by the one node, a highest priority data segment;

(e) dividing into pages, by the one node, the selected highest priority data segment, wherein the pages are smaller in size than the selected highest priority data segment;

(f) selecting for data consistency analysis, by the one node, a sequentially next one of the pages;

(g) creating a hash value, by the one node, of the selected, sequentially next one of the pages;

(h) obtaining, by the one node, a hash value of the selected, sequentially next one of the pages from each other node in the cluster of nodes containing a replica of the selected, sequentially next one of the pages;

(i) determining, by the one node, that the created hash value does not match the obtained hash value by comparing, by the one node, that the created hash value to the obtained hash value;

(j) obtaining, by the one node, the selected, sequentially next one of the pages and corresponding time stamp from each other node in the cluster of nodes containing the replica of the selected, sequentially next one of the pages;

(k) comparing, by the one node, a time stamp of the selected, sequentially next one of the pages with the obtained time stamp from each other node in the cluster of nodes containing the replica of the selected, sequentially next one of the pages;

(l) sending as an update, by the one node, the selected, sequentially next one of the pages to each other node in the cluster of nodes containing the replica of the selected, sequentially next one of the pages, when the comparison shows the selected, sequentially next one of the pages has the most current time stamp; and, (m) updating, by the one node, the selected, sequentially next one of the pages of the one node with the obtained sequentially next one of the pages having a most current time stamp and sending as an update, by the one node, the obtained sequentially next one of the pages having the most current time stamp to each other node in the cluster of nodes containing the replica of the selected, sequentially next one of the pages, except for the node in the cluster of nodes containing the obtained sequentially next one of the pages having the most current time stamp, when the comparison shows the selected, sequentially next one of the pages does not have the most current time stamp.

12. The non-transitory computer readable medium of claim 11, wherein the method further comprises:

repeating steps (f) through (l) until it is determined, by the one node, that there are no more sequentially next one of the pages to be selected; and updating the metadata in the globally available location with the results of steps (l) and (m).

13. The non-transitory computer readable medium of claim 11, wherein the method further comprises the steps of repeating steps (c) through (m).

14. The non-transitory computer readable medium of claim 11, wherein prioritizing for data consistency analysis the data segments uses a Least Recently Used (LRU) schema.

15. The non-transitory computer readable medium of claim 11, wherein:

prioritizing for data consistency analysis the data segments is performed by computing a priority score for each of the data segments; and, wherein the highest priority data segment is the data segment having a lowest priority score.

16. The non-transitory computer readable medium of claim 11, wherein sending as an update, by the one node, the selected, sequentially next one of the pages to each other node in the cluster of nodes containing the replica of the selected, sequentially next one of the pages uses a standard write process.

17. The non-transitory computer readable medium of claim 11, wherein updating, by the one node, the selected, sequentially next one of the pages of the one node with the obtained sequentially next one of the pages having a most current time stamp and sending as an update, by the one node, the obtained sequentially next one of the pages having the most current time stamp to each other node in the cluster of nodes containing the replica of the selected, sequentially next one of the pages, except for the node in the cluster of nodes containing the obtained sequentially next one of the pages having the most current time stamp, uses a standard write process.

* * * * *